July 9, 1929. F. PAMPINELLA 1,720,432
RUBBER ECCENTRIC BUSHING
Filed Jan. 11, 1927
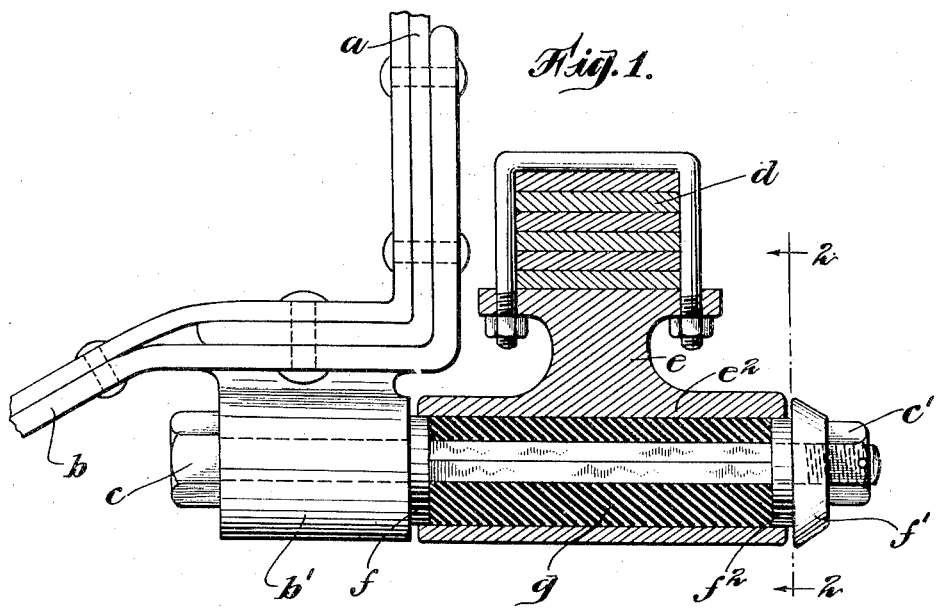
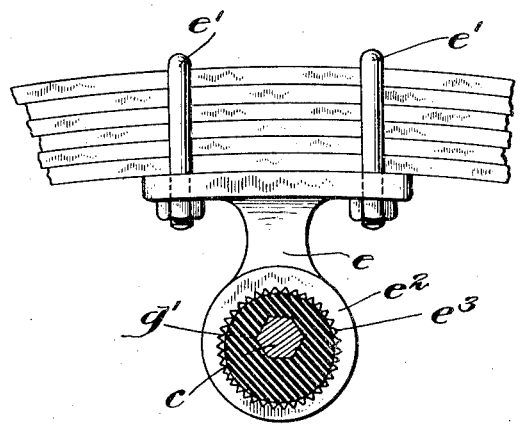
Inventor
Frank Pampinella
By his Attorneys
Redding, Greeley, O'Shea & Campbell Patented July 9, 1929.

1,720,432

UNITED STATES PATENT OFFICE.

FRANK PAMPINELLA, OF BROOKLYN, NEW YORK, ASSIGNOR TO INTERNATIONAL MOTOR COMPANY, OF NEW YORK, N. Y., A CORPORATION OF DELAWARE.

RUBBER ECCENTRIC BUSHING.

Application filed January 11, 1927. Serial No. 160,357.

The present invention relates to bushings which are used in connection with cantilever spring mountings and deals particularly, with rubber, or other non-metallic material, which is used to provide a yielding connection between two elements, one of which is to be mounted upon the other.

An object of the present invention is to provide a bushing of the character noted above, which may be applied in a suitable mounting, and which may be acted upon to increase, or vary the degree of positiveness with which the two elements are connected. Other and further objects will be apparent from the following description and the drawings, wherein:

Figure 1 is an elevation, partly in section, showing the application of a bushing of the present form, to a cantilever spring mounting.

Figure 2 is a view, partly in section, taken on the line 2—2 of Figure 1 and looking in the direction of the arrows.

In the drawings $a$ designates the frame of a vehicle provided with a bracket $b$, which may be riveted thereto. The bracket $b$ has formed integral therewith an extension $b'$ which serves as a bearing for a bolt $c$.

The spring $d$ has a bracket $e$ secured thereto as by means of U-shaped clamping members $e'$ and the bracket carries a cylindrical bearing member $e^2$. On the inner surface of the cylindrical member serrations $e^3$ are formed which serve to prevent the rubber bushings from turning with respect to the cylindrical member.

The bolt $c$ is preferably of a cross section such as shown in Figure 2 in order to prevent the bushing from turning on the bolt and its outer end extends through the cylindrical bearing and receives a nut $c'$. At the inner end of the bearing $e^2$, a washer $f$ is provided which is of a size enabling it to be received within the cylindrical bearing. A washer $f'$ is provided at the other end of the bearing member and has a portion $f^2$ which is similar to the washer $f$, and is received within the bearing member $e^2$.

The bushing $g$ is formed with a longitudinally extending hollow portion $g'$ which is disposed eccentrically with respect to the axis of the bushing. In assembling the structure, the bushing is positioned within the bearing member so that the greatest thickness of rubber will be placed between the bolts $c$ and that portion of the bearing member which carries the weight of the frame. In the present installation the greatest thickness will be between the bolt and the lower portion of the bearing $e^2$.

When the nut $c'$ is turned down, the extension $f^2$ moves toward the washer $f$ and compresses and expands the eccentric $g$ within the cylindrical bearing member $e^2$. By varying the extent of such pressure the character of the connection will be varied accordingly.

The present invention is not to be limited to the form disclosed herein but is to be limited only by the appended claims.

What I claim is:

1. In a bushing between two connecting members, a hollow bearing member, a shaft extending therethrough, a yielding non-metallic element carried between the two, washers carried by the shaft at either end of the bearing member and fitting thereinto and means to compress the element through the washers to vary the positive nature of the connection.

2. In a bushing between two connecting members, a hollow bearing member, a shaft extending therethrough, a yielding non-metallic element carried between the two, a longitudinally extending hollow portion eccentric to the axis of the element, and adapted to receive the shaft, and means carried by the shaft at either end of the bearing member to compress the yielding element to vary the positive nature of the connection.

3. In a bushing between two connecting members, a hollow bearing member, a shaft extending therethrough, a yielding non-metallic element carried between the two, serrations on the inner surface of the bearing member, an irregular surface on the shaft, a longitudinally extending hollow portion eccentric to the axis of the element and adapted to receive the shaft, washers carried by the shaft at either end of the bearing member and fitting therewith, and means to compress the element through the washers to vary the positive nature of the connection.

This specification signed this 24th day of December A. D. 1926.

FRANK PAMPINELLA.